United States Patent [19]
Vuillet et al.

[11] Patent Number: 4,585,391
[45] Date of Patent: Apr. 29, 1986

[54] TAIL ROTOR ARRANGEMENT WITH INCREASED THRUST FOR ROTARY WING AIRCRAFT AND DEVICE FOR INCREASING THE THRUST OF SUCH AN ARRANGEMENT

[75] Inventors: Alain Vuillet; Francoise J. Morelli, both of Aix-en-Provence, France

[73] Assignee: Societe Nationale Industrielle Aerospatiale, Paris, France

[21] Appl. No.: 536,387

[22] Filed: Sep. 27, 1983

[30] Foreign Application Priority Data

Oct. 6, 1982 [FR] France .................................. 82 16753

[51] Int. Cl.⁴ ...................... B64C 27/78; F04D 29/44
[52] U.S. Cl. .................................... 415/210; 415/217; 415/213 C; 415/DIG. 1; 416/123
[58] Field of Search .............. 415/210, 217, 209, 142, 415/148, 149 R, 150, DIG. 1, 213 C; 416/123; 60/269; 244/17.19, 17.21

[56] References Cited

U.S. PATENT DOCUMENTS

| | | | |
|---|---|---|---|
| 2,214,027 | 9/1940 | McClammy | 415/210 |
| 2,219,499 | 10/1940 | Troller | 415/210 |
| 2,311,896 | 2/1943 | Criqui | 417/366 |
| 2,322,715 | 6/1943 | Kloeren | 244/17.19 X |
| 2,420,784 | 5/1947 | Larsen | 416/123 X |
| 2,473,329 | 6/1949 | Candler | 415/160 |
| 2,516,819 | 7/1950 | Whittle | 415/208 X |
| 2,609,053 | 9/1952 | Lee | 416/123 X |
| 2,613,869 | 10/1952 | Anxionnaz et al. | 415/210 |
| 2,698,059 | 12/1954 | Pullin | 416/123 |
| 2,810,512 | 10/1957 | Lippisch | 416/155 X |
| 2,855,141 | 10/1958 | Van Rijn | 415/210 |
| 2,941,781 | 6/1960 | Boyum | 415/142 |
| 3,156,437 | 11/1964 | Mercier | 415/149 R X |
| 3,506,219 | 4/1970 | Mouille et al. | 244/17.21 |
| 3,561,883 | 2/1971 | Berry | 415/209 X |
| 3,583,659 | 6/1971 | Lermusiaux | 244/17.19 |
| 3,870,251 | 3/1975 | Breuner | 416/123 X |
| 3,924,964 | 12/1975 | Lievens et al. | 415/210 |
| 4,219,325 | 8/1980 | Gutzwiller | 415/210 X |
| 4,307,857 | 12/1981 | Godbersen | 415/210 X |
| 4,506,849 | 3/1985 | Lemont | 416/179 X |

FOREIGN PATENT DOCUMENTS

| | | | |
|---|---|---|---|
| 713617 | 11/1941 | Fed. Rep. of Germany | 415/207 |
| 1064191 | 8/1959 | Fed. Rep. of Germany | 415/210 |
| 2242988 | 3/1974 | Fed. Rep. of Germany | 415/210 |
| 2386706 | 12/1978 | France | 415/142 |
| 80691 | 2/1956 | Netherlands | 415/210 |
| 399643 | 3/1966 | Switzerland | 415/207 |
| 572417 | 10/1945 | United Kingdom | 415/160 |

*Primary Examiner*—Everette A. Powell, Jr.
*Attorney, Agent, or Firm*—Fisher, Christen & Sabol

[57] ABSTRACT

A tail rotor arrangement for rotary wing aircraft, comprising a tunnel of axis X—X transverse with respect to the aircraft and in which is disposed a multi-blade rotor coaxial with respect to the tunnel and generating a transverse air flow. The arrangement comprises a plurality of fixed blades disposed inside of the tunnel downstream of the rotor with respect to the air flow and arranged in at least substantially radial manner with respect to the tunnel in order to be able to recover, in the form of an axial thrust, the energy of rotation of the air flow at the outlet of the rotor. The tail rotor arrangement provides an increase in thrust of the rotors, particularly paired rotors.

8 Claims, 6 Drawing Figures

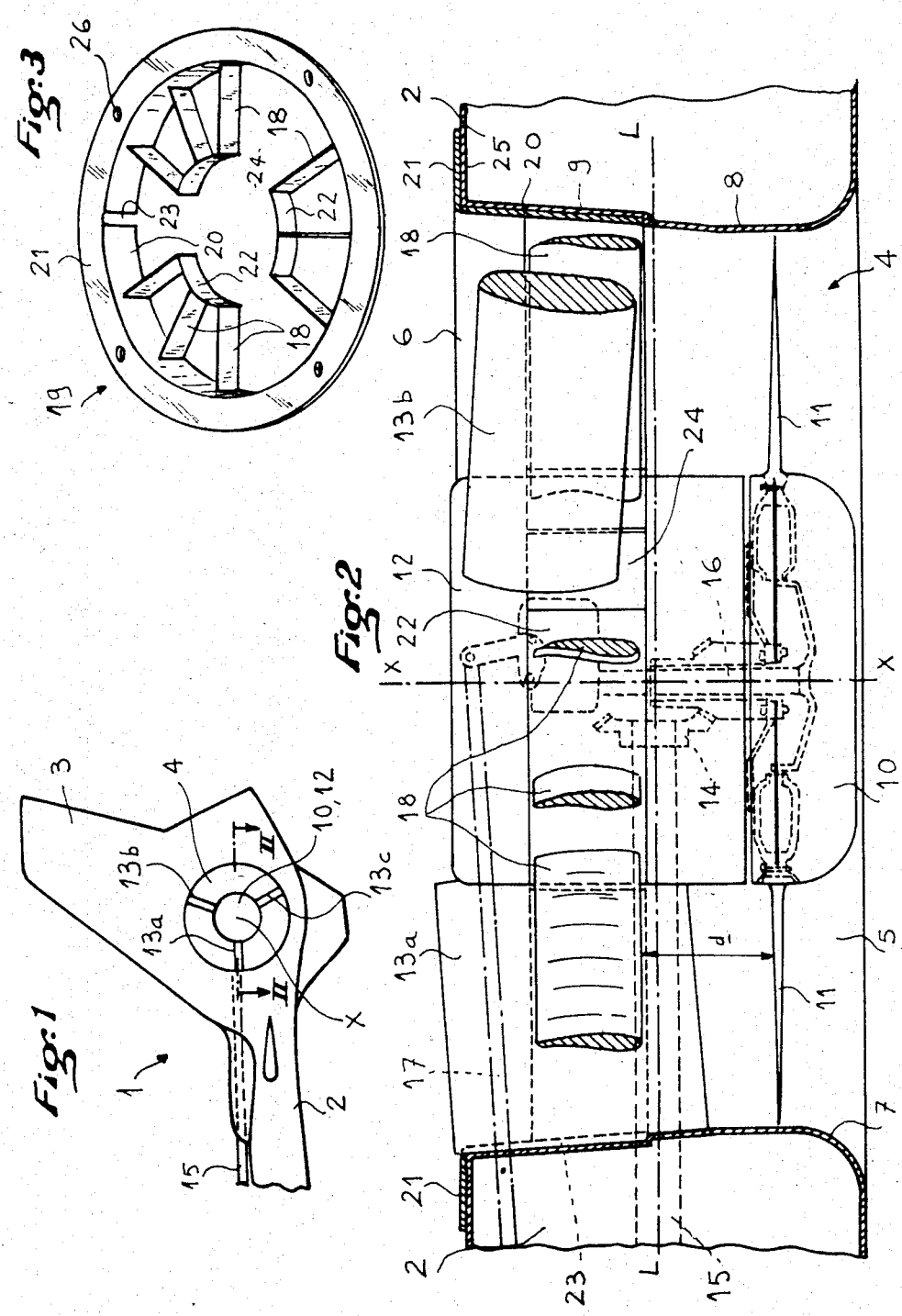

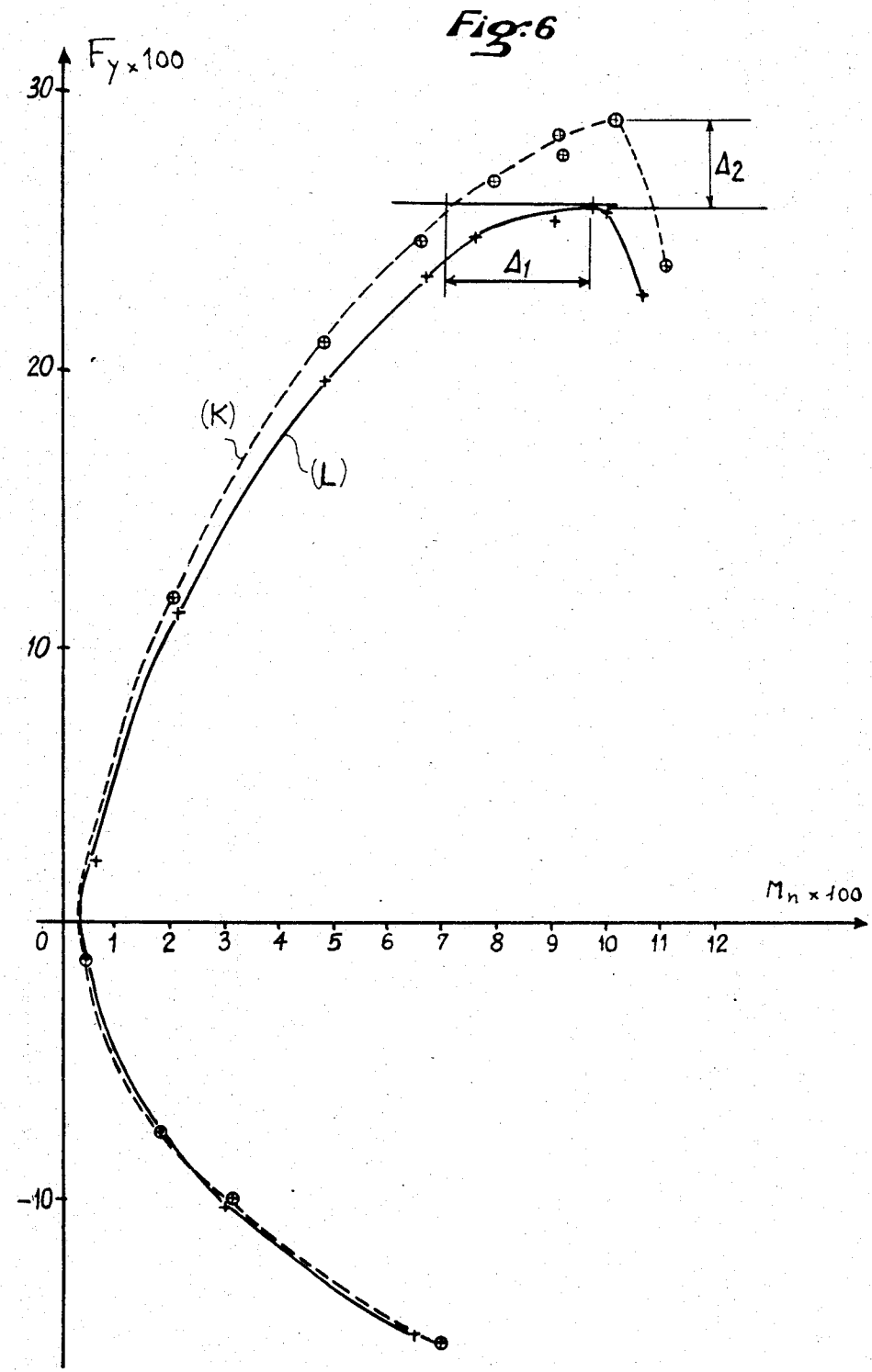

TAIL ROTOR ARRANGEMENT WITH INCREASED THRUST FOR ROTARY WING AIRCRAFT AND DEVICE FOR INCREASING THE THRUST OF SUCH AN ARRANGEMENT

BACKGROUND OF THE INVENTION

1. Field of The Invention

The present invention relates to a tail rotor arrangement with increased thrust for rotary wing aircraft and to a device for increasing the thrust of such a rotor arrangement.

2. Prior Art

In order permanently to balance the counter torque resulting from the rotation of the rotary wings and to control the aircraft on its yaw axis, particularly during maneuver in lateral translation at low speed, it is known to provide an auxiliary rotor disposed in the vicinity of the tail end of the aircraft and exerting a transverse thrust, which is adapted to all flight conditions. This auxiliary tail rotor therefore exerts on the aircraft a balance torque, of direction opposite the counter torque of the main rotor, i.e. in fact in the same direction as the driving torque of the rotary wings.

To adjust this balance torque to the range of values necessary to ensure desired balance and/or control of the aircraft, it is possible to act on the distance separating the auxiliary rotor from the axis of the rotary wings and/or on the thrust of said auxiliary rotor.

As a general rule, the auxiliary tail rotor is disposed as closely as possible to said rotary wings, as it is necessary to limit the overall dimensions of the rear part of the helicopter.

Moreover, a large lever arm leads to a considerable increase in the mass and the structure, and does not allow optimum management of the available power.

Under these conditions, it is the thrust furnished by the auxiliary tail rotor which is rathermore adjusted and it is generally sought to obtain from this auxiliary rotor a maximum thrust which is sufficiently high to satisfy the most demanding flight conditions and adjusting means are provided which enable only the part of this maximum thrust adapted to the other flight conditions to be taken.

To obtain from the auxiliary rotor a high maximum thrust, it may firstly be thought to derive from the rotary wing transmission a high power to drive said auxiliary rotor. Apart from the fact that such a solution may necessitate an increase in power of said motor, it necessarily requires a transmission which is sufficiently resistant and therefore of high mass. In the case of an already existing auxiliary rotor of which it is desired to increase the thrust by this means, it would be necessary to modify the transmission to increase the mechanical resistance thereof, which would increase the mass of the rear propulsive assembly and, moreover, would risk the blades of said auxiliary rotor generating loud noise.

To increase the maximum thrust of an auxiliary tail rotor, the angle of pitch of the blades of said rotor may also be increased. However, on the one hand this requires additional power with the concomitant drawbacks mentioned above and, on the other hand, limits the range of use of the blade profiles, i.e. the possibility of maneuver, since one is then closer to the maximum angle of pitch admissible. Moreover, the appearance of the phenomenon of separation of the flow of air on the blades appears very rapidly, with the result that the action of the auxiliary rotor risks being lessened and even annulled.

U.S. Pat. No. 2,473,329 provides a tail rotor system for helicopter with high yield since this rotor is located inside a tunnel comprising a cylindrical air intake and a divergent air outlet. In this system, the pitch of the blades of the rotor is fixed, but the intake of air inside said tunnel (and therefore the thrust) is controlled due to rotary flaps disposed in said cylindrical intake part, upstream of the rotor.

Similarly, British Pat. No. 512,417 describes a tail rotor system for helicopter comprising a rotor disposed in a tunnel and provided with flaps upstream of said rotor. Moreover, the air outlet is constituted by an adjustable skirt. In this system, the thrust exerted by the rotor is controlled via the adjustable skirt and either by the pitch of the blades of the rotor, said flaps being fixed, or by the pitch of the flaps, the pitch of the rotor blades then being fixed. Means for controlling the orientation of the axis of said auxiliary rotor are even provided.

BROAD DESCRIPTION OF THE INVENTION

It is an object of the present invention to obtain the maximum thrust of a tail rotor of a rotary wing aircraft, as well as to increase the thrust of such a rotor which is already existing, without increasing the power furnished thereto and at the same time overcoming the drawbacks mentioned hereinabove. It is more particularly applicable to a faired tail rotor, i.e. comprising a tunnel inside which said rotor is disposed.

To this end, according to the invention, the tail rotor arrangement for rotary wing aircraft, comprising a tunnel of axis transverse with respect to said aircraft and in which is disposed a multi-blade rotor coaxial with respect to said tunnel and generating a transverse air flow, is noteworthy in that it comprises a plurality of fixed blades disposed inside said tunnel downstream of said rotor with respect to said air flow and arranged in at least substantially radial manner with respect to said tunnel in order to be able to recover, in the form of an axial thrust, the energy of rotation of the air flow at the outlet of the rotor.

In this way, with equal power furnished to the rotor, the total thrust furnished by said rotor may be increased.

It will be readily noted that the purposes and means of the present invention on the one hand and of U.S. Pat. No. 2,473,329 and British Pat. No. 572,417 on the other hand, are entirely different, although they all relate to faired rotors. In fact, the purpose of the devices described in the two prior Patents is to adjust, by reducing, the value of the transverse thrust from a maximum value of thrust defined once and for all by the combination of a rotor and a tunnel, the means to this end being constituted by mobile or fixed obturation flaps disposed in the tunnel upstream of the rotor and possibly by a mobile skirt forming exhaust nozzle. On the other hand, the purpose of the present invention is to increase the maximum thrust of a rotor arrangement presenting a defined tunnel and rotor structure, without increasing the power furnished, and to this end the energy of rotation of the air flow is recovered at the outlet of the tunnel, by straightening up this air stream by means of fixed radial blades disposed downstream of said rotor.

If, as is usual, the rotor rotates with respect to a fixed hub, disposed coaxially to the tunnel and inside which the control and transmission members are disposed, it is advantageous if said fixed blades are disposed between said hub and said tunnel, so as to participate at least partially in the mechanical connection therebetween. The fixed blades may in that case either ensure fixation of the fixed hub and of the rotor in the tunnel alone, or may cooperate with support arms specially provided for holding said hub and the rotor. In both cases, the presence of said blades between the fixed hub and the tunnel gives the latter considerable rigidity, so that the clearance between the ends of the blades of the rotor and the wall of the tunnel may be reduced to a maximum and the overall aerodynamic performances of the rotor may therefore be improved. In this way, said blades make it possible not only to recover in the form of thrust a major part of the energy furnished by the rotor, but they also improve the overall yield of the anti-torque rotor.

If the rotor arrangement comprises, in addition to the fixed blades, such hub supporting arms, said fixed blades may be disposed either in the spaces between said radial support arms or upstream of said support arms.

In the first of these embodiments, it is advantageous if the radial support arms present the same profile and the same setting as the fixed blades in order to reinforce the straightening action of the air flow exerted thereby.

For the second of these embodiments, it will be noted that the plurality of the fixed blades bringing about a reduction in the tangential speeds of the air flow, the drag of said radial support arms is then reduced, which improves the propulsive yield of the rotor arrangement and is particularly advantageous when the air flows are separated from said support port arms in the event of too considerable an angle of attack in the course of maneuver or during a gust of wind.

The distance separating the trailing edge of the rotating blades of the rotor from the leading edge of the fixed blades is at least equal to once the length of the chord of the profile of said rotating blades.

All the fixed blades are advantageously fast with one another to form a monolithic assembly capable of being mounted in one piece in the tunnel. This monolithic assembly may be provided to fit by simple interlocking at the outlet of the tunnel.

The present invention also relates to a device, on the one hand adapted for a tail rotor arrangement for rotary wing aircraft comprising a tunnel of axis transverse to said aircraft and in which is disposed a multi-blade rotor coaxial to said tunnel and generating a transverse air flow and, on the other hand, provided to recover in the form of axial thrust the energy of rotation of the air flow at the outlet of the rotor, this device being noteworthy in that it comprises a monolithic assembly of a plurality of fixed blades, disposed inside said tunnel downstream of said rotor with respect to said air flow so that said blades are at least substantially radial with respect to said tunnel. Such a monolithic device may thus be mounted either on tunnels specially designed to this end, or on tunnels of rotor arrangements initially not provided with the device of the invention. It therefore enables already existing rotor arrangements to be improved.

Where, as is usual, the rotor arrangement comprises a fixed hub coaxial to the tunnel, this monolithic device advantageously comprises an outer ring and an inner ring concentric to each other and between which said fixed blades are radially disposed, the outer diameter of the outer ring corresponding to the inner diameter of the part of tunnel in which said device is disposed and the inner diameter of the inner ring corresponding to the outer diameter of the part of hub gripped by said inner ring.

If the assembly of fixed blades is to be disposed at the level of the arms supporting the hub, the outer and inner rings comprise recesses for the passage of said radial support arms and said fixed blades are disposed in the spaces defined between said recesses.

BRIEF DESCRIPTION OF THE DRAWINGS

The invention will be more readily understood on reading the following description with reference to the accompanying drawings, in which:

FIG. 1 is a partial view of the rear part of a helicopter provided, with a rotor arrangement according to the invention.

FIG. 2 is an enlarged section along line II—II of FIG. 1, showing in axial section a particular embodiment of the rotor arrangement according to the invention.

FIG. 3 shows an assembly of straightening blades according to the invention for the rotor arrangement of FIGS. 1 and 2.

FIG. 6 illustrates the result of comparative tests between two identical rotor arrangements, only one of them being equipped with the straightening blades according to the invention.

DETAILED DESCRIPTION OF THE INVENTION

Figure 4:
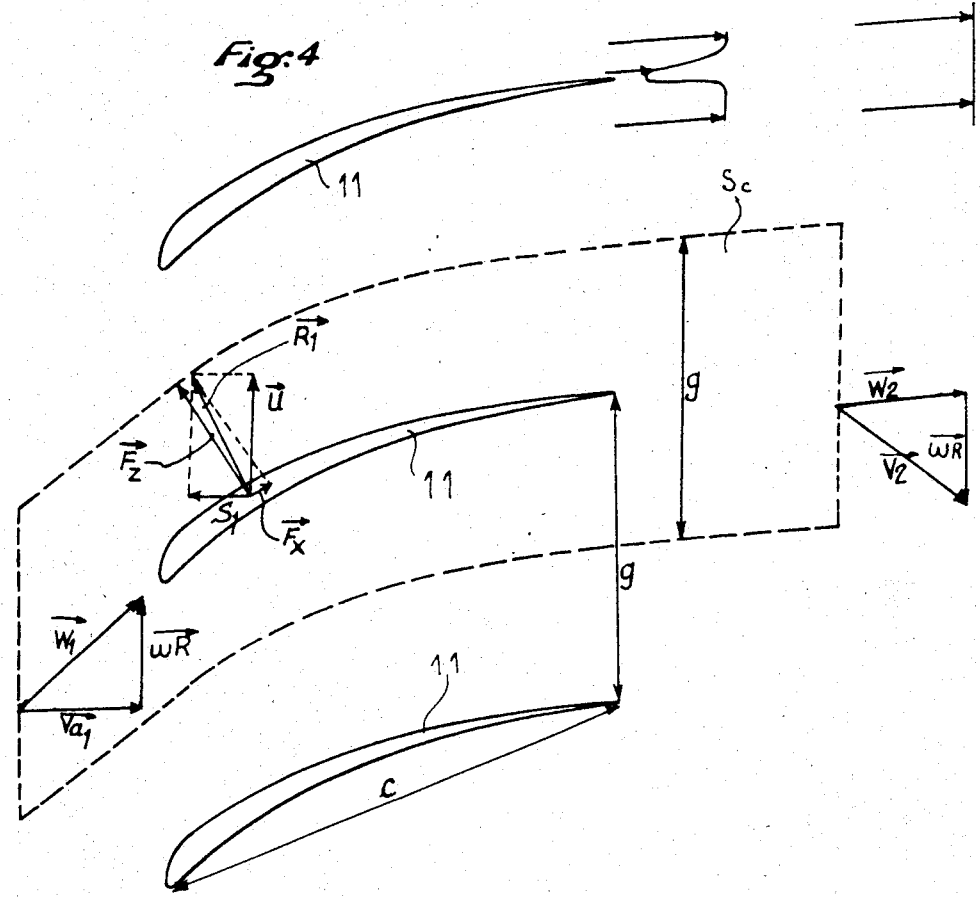
FIGS. 4 and 5 are diagrams illustrating the operation of the rotor arrangement according to the invention.

Referring now to the drawings, the helicopter tail 1 shown in FIG. 1 comprises a part of fuselage 2 and a vertical fin 3.

At the base of the vertical fin 3 is arranged a tunnel 4 passing right through fuselage part 2 so that this tunnel comprises an air intake 5 on one side of the fuselage and an air outlet 6 on the other side of said fuselage.

Tunnel 4 presents a form of revolution about an axis X—X, transverse to the longitudinal axis L—L of the helicopter. For example, the air intake 5 presents a rounded peripheral edge 7 which is extended, towards the air outlet 6, by a cylindrical portion 8 itself extended up to said air outlet 6 by a divergent portion 9.

In tunnel 4 is mounted a rotor 10 provided with a plurality of blades 11. This rotor 10 is borne by a fixed hub 12 fast with the structure of the helicopter via three arms 13a, 13b and 13c. The rotor 10 and the fixed hub 12 are cylindrical in form and are centred on axis X—X of tunnel 4. The rotor 10 is disposed on the air intake 5 side so that, for example, the ends of the blades 11 lie opposite the cylindrical portion 8 of the tunnel 4, whilst the fixed hub 12 lies on the air outlet 6 side.

In known manner, there is located inside the hub 12 a mechanism 14 for rotating the rotor hub 10, itself driven by a shaft 15 moved by the or each main motor (not shown) of the aircraft intended for driving the rotary wings (likewise not shown). As explained above, rotor 10 thus creates the air flow which generates the transverse thrust necessary for balance of the helicopter in yaw.

In likewise known manner, to vary the intensity of this transverse thrust, a system 16 for controlling the angle of pitch of the blades 11, actuated via a control rod 17, is provided inside the hub 12 and partially inside the rotor.

As shown in FIG. 2, one of the arms (13a) supporting the hub 12 serves as fairing for the shaft 15 and the rod 17.

The arms 13a, 13b and 13c may be uniformly distributed at 120° about axis X—X and disposed with a certain relative offset to the rear of the plane of blades 11.

According to the invention, in the tunnel 4 downstream of blades 11 of the rotor, are provided a plurality of fixed blades 18 adapted to recover the energy of rotation of the air flow passing through the tunnel 4 under the action of the blades 11 of the rotor and disposed radially with respect to said tunnel.

In the embodiment shown in FIGS. 2 and 3, the plurality of blades 18 form an integral assembly 19 comprising an outer ring 20, provided with a flange 21, and an inner ring 22, said blades 18 being fast at their ends with the outer ring 20 and inner ring 22. These two concentric rings 20 and 22 comprise notches or interruptions 23 or 24 respectively for the passage of arms 13a, 13b and 13c.

When the assembly 19 is positioned in tunnel 4, ring 22 is applied on hub 12, ring 20 is applied against the wall of the divergent portion 9 and flange 21 is applied against the outer edge 25 of the air outlet 6, to which it is fixed with the aid of fixing means (not shown) passing through holes 26 provided in flange 21. The three arms 13a, 13b and 13c then pass through the notches or interruptions 23 and 24. To avoid ring 20 forming excess thickness with respect to the wall of the divergent portion 9, this wall comprises the impression of said ring with the result that, when the assembly 19 is in position in tunnel 4, part of the divergent 6 is formed by ring 20. Similarly, the impression of ring 22 may be provided in hub 12.

Since the support arms 13a, 13b and 13c are distributed equally about axis X, blades 18 of assembly 19 form three identical groups separated from one another and each adapted to be inserted in the space between two of said arms.

The embodiment of FIGS. 2 and 3 has of course been given only by way of example and it goes without saying that blades 18 may be either independent of one another or may form an assembly or several assemblies of structure differing from that of assembly 19.

However, the embodiment of FIGS. 2 and 3 presents the advantage, on the one hand, of a considerably simple assembly on tunnel 4, and on the other hand, of being adaptable to rotor arrangements which were manufactured prior to the invention and whose thrust it is desired to increase. In this case, as it is difficult to form the impression of the ring 20 in the divergent portion 6, it is advantageous to produce it with as small a thickness as possible. Moreover, this assembly 19 with two concentric rings 20 and 22 connected by radial blades 18 is considerably rigid, with the result that it contributes to rigidifying the tunnel 4, which is favourable to the aerodynamic yield of the rotor 10, since the clearance between the end of its blades 11 and the wall of the portion of tunnel 8 may then be reduced to a maximum.

Particularly in order to set aside any risk of generating prohibitive noise, the fixed blades 18 are advantageously located downstream of the mobile blades 11 without, however, leaving the divergent portion. It has been found that, when the distance d between the trailing edge of blades 11 (shown flat in FIG. 2, i.e. with an angle of attack of 90°) and the leading edge of the fixed blades 18 was at least equal to once the length c of the chord of the profile of the blades 11, there was no risk of prohibitive noise.

Good results have been obtained with fixed blades 18 presenting a constant profile and a zero twist along their span, which greatly facilitates manufacture of said blades 18 and the assembly 19.

The profile of blades 18 may for example be of the NACA 65 A 10 type, possibly deformed about its mean line. The angle of attack of the fixed blades 18 is preferably of some degrees with respect to axis X—X.

Of course, although this has not been shown in FIG. 2, arms 13a, 13b and 13c may be profiled in similar manner to the fixed blades 18 in order to participate in straightening up the air flow passing through tunnel 4.

Figure 5:
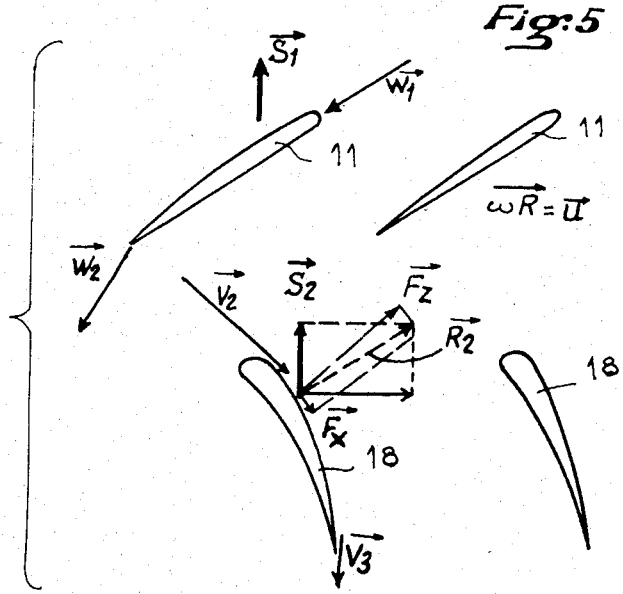

FIGS. 4 and 5 explain the operation of the fixed blades 18 according to the invention, the principle being that the aerodynamic conditions at the outlet of the rotor 10 are essentially those at the inlet of the fixed blades 18.

FIG. 4 illustrates the action of the rotating blades 11 of rotor 10, considering what occurs inside a control surface Sc corresponding to a pitch g.

As indicated in this FIG. 4, the speed of rotation $u = \omega R$ of the rotor is combined with the axial intake speed $V_{a1}$ of the air to give a relative speed $W_1$ of the flow of air to the rotor, this latter speed establishing a field of pressure about the mobile blade 11 in question.

This field then generates an aerodynamic resultant $R_1$ which may, on the one hand, resolve in an effort of lift $F_z$ and an effort of drag $F_x$, on the other hand, gives rise to an axial thrust $S_1$ of direction orthogonal to the direction of the speed of rotation of the rotor.

Following the first obstacle constituted by the blade 11 in question, the air leaves the rotor 10 under different speed conditions, and the triangle of the outlet speeds makes it possible to distinguish: a new relative speed $W_2$ at the rotor less than $W_1$, and an absolute speed $V_2$ which attacks the fixed blade 18 in correspondence.

The speed $V_2$, acting for the fixed blade 18 the same role as speed $W_1$ for the mobile blade 11, an additional thrust $S_2$ is created (cf. FIG. 5).

It should be noted that, in the variant embodiment mentioned above, in which the support arms 13a, 13b and 13c of the hub 12 are disposed partially downstream of the fixed blades 18, the air flows having the outlet speed $V_3$ of the blades 18, less than the corresponding speed at the outlet of blades 11, advantageously come into tangential contact with said arms, which allows a reduction of the drag thereof and therefore improves the propulsive yield of the rotor arrangement.

It is thus seen that, thanks to the invention, by judiciously using the space available downstream of rotor 10 of a faired anti-torque rotor arrangement, it is possible to produce a compact, balanced and rigid propulsive assembly which procures an increased thrust of the rotor without modifying the power furnished.

Wind-tunnel trials have made it possible to assess the influence of the fixed blades on the performances of the rotor arrangement.

The rotor arrangement of FIG. 2 with and without the assembly 19 of fixed blades 18 were tested on a reduced-scale model.

FIG. 6, in a reduced thrust $F_y$ (on the y-axis)-reduced power $M_n$ (on the x-axis) diagram, shows the curve (K) corresponding to the presence of the assembly 19 and curve (L) corresponding to the absence of said assembly 19. It may be seen that the present invention makes it possible to obtain a gain $\Delta_1$ of 27% with equal thrust at stall and a gain $\Delta_2$ of 13% with equal power and equal pitch at stall.

In the diagram of FIG. 6, the reduced thrust $F_y$ and the reduced power $M_n$ are expressed respectively by:

$$F_y = \frac{S}{\frac{1}{2}\rho A U^2} \text{ and } M_n = \frac{W}{\frac{1}{2}\rho A U^3}$$

in which S=axial thrust; W=power; $\rho$=density of air; A=surface of the rotor disc; U=peripheral speed.

What is claimed is:

1. A device for use as a tail rotor arrangement for rotary wing aircraft, comprising in combination: an aircraft; said aircraft having a tunnel of axis X—X transverse to said aircraft and in which is disposed a multiblade rotor coaxial to said tunnel and generating a transverse air flow and, on the other hand, provided to recover in the form of axial thrust the energy of rotation of the air flow at the outlet of the rotor, wherein said device comprises a monolithic assembly of a pluraltiy of fixed blades, disposed inside said tunnel downstream of said rotor with respect to said air flow so that said blades are at least substantially radial with respect to said tunnel;

said plurality of fixed blades being arranged such that the distance separating the trailing edges of each of said plurality of rotating blades from the leading edges of each of said plurality of fixed blades is at least equal to once the length of the chord of the profile of said rotating blades.

2. The device of claim 1, wherein said rotor rotates with respect to a fixed hub which is coaxial to the tunnel, said fixed hub comprising an outer ring and an inner ring which are concentric to each other and between which said fixed blades are radially disposed, the outer diameter of the outer ring corresponding to the inner diameter of the part of tunnel in which said device is disposed and the inner diameter of the inner ring corresponding to the outer diameter of the part of hub gripped by said inner ring.

3. The device of claim 2 further comprising radial support arms; said fixed hub being connected to the structure of said aircraft by said radial support arms, wherein the outer and inner rings comprise recesses for the passage of said radial support arms and said plurality of fixed blades are disposed the spaced defined between said recesses.

4. A tail rotor arrangement for rotary wing aircraft comprising:

a tunnel of axis transverse with respect to said aircraft a fixed hub disposed inside said tunnel with its axis coaxially arranged to said axis of said tunnel;

a multiblade rotor disposed inside said tunnel and rotating about said axis of said fixed hub, said multiblade rotor having a plurality of rotating blades and generating a transverse air flow;

a plurality of fixed blades disposed inside said tunnel in an at least substantially radial manner with respect to said tunnel for rigidly connecting said tunnel and said fixed hub, said plurality of fixed blades being disposed downstream of said multiblade rotor with respect to said air flow and being profiled for recovering, in the form of an axial thrust, the energy of rotation of said air flow at the outlet of said multiblade rotor;

said plurality of fixed blades being arranged such that the distance separating the trailing edges of each of said plurality of rotating blades from the leading edges of each of said plurality of fixed blades is at least equal to once the length of the chord of the profile of said rotating blades.

5. The arrangement of claim 4, wherein further radial support arms are provided for rigidly connecting said tunnel to said fixed hub, said fixed blades being disposed in the space between said radial support arms.

6. The arrangement of claim 5, wherein said radial support arms present the same profile as individual said plurality of fixed blades in order to reinforce the action thereof.

7. The arrangement of claim 4, wherein said plurality of fixed blades are fastened to one another to form a monolithic assembly.

8. The arrangement of claim 7, wherein said monolithic assembly is fits by simple interlocking at the outlet of the said tunnel.

* * * * *